US006895307B2

(12) United States Patent
Gardner, Jr.

(10) Patent No.: US 6,895,307 B2
(45) Date of Patent: May 17, 2005

(54) DATA PROCESSING SYSTEM FOR MANAGING CHEMICAL PRODUCT USAGE

(75) Inventor: James P. Gardner, Jr., Stillwater, MN (US)

(73) Assignee: Ecolab Inc., Mendota Heights, MN (US)

( * ) Notice: Subject to any disclaimer, the term of this patent is extended or adjusted under 35 U.S.C. 154(b) by 0 days.

(21) Appl. No.: 10/414,547

(22) Filed: Apr. 14, 2003

(65) Prior Publication Data

US 2003/0195657 A1 Oct. 16, 2003

Related U.S. Application Data

(63) Continuation of application No. 10/027,116, filed on Dec. 19, 2001, now Pat. No. 6,697,706, which is a continuation of application No. 09/428,841, filed on Oct. 28, 1999, now Pat. No. 6,377,868.

(51) Int. Cl.[7] .............................................. G06F 17/00
(52) U.S. Cl. ...................................................... 700/266
(58) Field of Search ................................. 702/188, 183, 702/184; 705/7, 10, 11; 700/231, 236, 241, 244

(56) References Cited

U.S. PATENT DOCUMENTS

| | | | |
|---|---|---|---|
| 4,845,965 A | | 7/1989 | Copeland et al. |
| 4,858,449 A | | 8/1989 | Lehn |
| 4,964,185 A | | 10/1990 | Lehn |
| 5,014,211 A | * | 5/1991 | Turner et al. ............... 700/239 |
| 5,038,807 A | * | 8/1991 | Bailey et al. ............. 134/57 D |
| 5,222,027 A | * | 6/1993 | Williams et al. ............ 700/239 |
| 5,345,379 A | * | 9/1994 | Brous et al. .................. 700/17 |
| 5,681,400 A | * | 10/1997 | Brady et al. .................. 134/18 |
| 5,694,323 A | * | 12/1997 | Koropitzer et al. ......... 705/400 |
| 5,745,381 A | * | 4/1998 | Tanaka et al. ............... 702/182 |
| 5,777,895 A | * | 7/1998 | Kuroda et al. ............... 702/188 |
| 5,839,097 A | * | 11/1998 | Klausner ................ 340/825.69 |
| 6,167,358 A | * | 12/2000 | Othmer et al. .............. 702/188 |
| 6,321,204 B1 | * | 11/2001 | Kazami et al. ................. 705/7 |

OTHER PUBLICATIONS

*We'd like to make a couple of things perfectly Clear*, AQUABALANCE Pool and Spa Management, Ecolab brochure, 1998 Ecolab Inc.
*White Paper, Ecolab Balancer. Com*, MRE Jun. 4, 1997.
relax. *We've Got Your Pool Concerns Under Control*, Ecolab Water Care Services, 1998 Ecolab, Inc.
Presentation, "ECOLAB Aramark Uniform Services Joining Forces for Service Excellence".
T–Jet 2000 PC "Wash–Aisle Productivity Manager Software Guide", ECOLAB Textile Care Division, 28584/4001/0399 (9207–4327).
Sample Reports consisting of 10 pages.
Sample Reports, Novalink System, 96–04620–00A, consisting of 8 pages.

(Continued)

*Primary Examiner*—Khoi H. Tran
(74) *Attorney, Agent, or Firm*—Merchant & Gould P.C.

(57) ABSTRACT

A data processing system is used to manage and track use of chemical product in a washing machine. A detergent dispenser distributes the chemical products (e.g., detergent, rinse agent, and bleach) to the washing machine. The dispenser includes a monitor that detects dispenser data based on distribution of the chemical product by the dispenser. A database is coupled to the dispenser and stores an account identifier and an alignment identifier in association with the dispenser data of the dispenser. The database further stores corporate data in association with the dispenser data, the account identifier, and the alignment identifier. An analysis application analyzes the dispenser data in relation with the corporate data to characterize use of the chemical product in the chemical application system and provide a feedback loop. The analysis application can limit its analysis to data associated with a given account identifier or a given alignment identifier.

17 Claims, 9 Drawing Sheets

OTHER PUBLICATIONS

Nova Controls, Nova News, "Save Money and Gain Sales Features?".

Novalink Overview Program Pricing.

Orion Liquid Laundry Supply Dispenser.

NOVALINK Laundry Information System, "ControlMaster Version 2.0 for Windows User's Guide".

PerSyst Inc. "LDAS–2000 Remote Information Control and Management System for the Commercial Laundry And Vending Industry".

PerSyst Inc. Dial–A–Wash Automatic Laundry Room Attendant for Apartment and Complex Laundry Rooms.

iNtOUCH Water Treatment Information Management Solution Statement of Work Presented to: ECOLAB (draft form), Mar. 29, 1999.

Brochure, NOVALINK, "The Laundry Information System" from Nova Controls.

Diverlog–L Enhanced "DLE—Production Summary Reports", Diversey.

Diverlog–L Enhanced "DLE—Set–up Report", Diversey.

Diverlog–L Enhanced "DLE—Single Cycle Reports", Diversey.

CLAX Diverflow System Advanced Central Dosing Technology For Laundries Sep. 10, 1999.

* cited by examiner

DATA PROCESSING SYSTEM FOR MANAGING CHEMICAL PRODUCT USAGE

This application is a continuation of U.S. patent application Ser. No. 10/027,116, filed on Dec. 19, 2001, now U.S. Pat. No. 6,697,706, which is a continuation of U.S. patent application Ser. No. 09/428,841, filed Oct. 28, 1999, now U.S. Pat. No. 6,377,868, both of which are incorporated herein by reference in their entirety.

TECHNICAL FIELD

The invention relates generally to storage and processing of data related to chemical product usage, and more particularly, to collecting, communicating, and analyzing chemical product usage data based on distribution of the product by a product dispenser.

BACKGROUND OF THE INVENTION

Institutional laundry facilities, such as those employed in many large hotels, nursing homes, and hospitals, typically employ washing machines with separate automated detergent dispensers. Generally, these institutional washing machines are larger and wash greater volumes of laundry over time than standard consumer washing machines used in homes. Typically, a separate, automated cleaning product dispenser is connected to one or two industrial washing machines to automatically deliver cleaning products, such as detergent, bleach, rinse agent, etc., according to logic designed or programmed into the dispenser.

In a broader sense, automated chemical product ("chemistry") dispensers are useful in many different chemical application systems, including cleaning systems relating to laundry operations, warewashing operations (e.g., a dishwasher), water treatment operations, and pool and spa maintenance, as well as other systems, such as food and beverage operations and agricultural operations. For example, chemical products used in a warewashing operation may include detergent, de-ionized water, sanitizers, stain removers, etc. Chemistry used in agriculture may include without limitation pesticides, herbicides, hydration agents, and fertilizers. Other applications of the present invention may be used in, without limitation, dairies and dairy farms, (e.g., in teat dips); breweries; packing plants; pools spas, and other recreational water facilities; water treatment facilities; and cruise line. Other chemical products may include without limitation glass cleaning chemicals, hard surface cleaners, antimicrobials, germicides, lubricants, water treatment chemicals, rust inhibitors, etc.

Automated chemical product dispensers can reduce labor and chemistry costs by automatically delivering predetermined amounts of chemicals in a proper sequence. Furthermore, some chemical products can be hazardous in concentrated form; therefore, automated chemical product dispensers reduce the risks of exposure to operators, who would otherwise measure and deliver the chemical products manually.

In a laundry operation, to coordinate the proper delivery of cleaning product for each washing machine cycle, both the washing machine and the dispenser are preferably programmed to run a given "formula" for a particular type of item being washed. For example, if the laundry operator is washing bed sheets, he or she selects a washing machine selection corresponding to a set of cycles (i.e., a formula) for "sheets" and selects a separate dispenser setting corresponding to a "sheets" formula of chemical products (e.g., including possibly detergent, bleach, sanitizer, and rinse agent). Therefore, the dispenser supplies the proper cleaning product (or provides no cleaning product) for appropriate washer cycles, in accordance with the selected formulas. In this manner, for example, detergent is supplied to the washing machine during the wash cycle and not during the rinse cycle.

Unfortunately, operator error (i.e., improper formula selections on one or both of the washing machine and the dispenser) can result in the cleaning products being supplied to the washing machine during the wrong cycle or not at all. Such errors can result in improperly washed or potentially damaged laundry items. Other costly inefficiencies can include washing items without filling the wash basin to capacity, which wastes water, energy, and cleaning product and increases labor and maintenance costs.

In addition, individual institutional laundry accounts tend to be geographically dispersed, requiring many individual field service managers to physically visit individual laundry operations or accounts periodically, to monitor product usage on a periodic basis at those operations, and to provide the corrective instructions to the corresponding laundry operators. Typically, this manual method fails to provide the rapid feedback or the cross-account analysis that can be helpful to laundry operators in managing their operations.

Accordingly, it is desirable to maintain and analyze automatically a real-time or historical log of operational data detectable or storable by a dispenser or a dispenser-related device, preferably in relation to corporate information, such as work shifts, facility location, hotel occupancy rates, energy costs, etc., so as to facilitate rapid corrective action. Existing approaches, however, fail to provide the capability or capacity of automatically detecting large amounts of dispenser data, communicating and recording dispenser data and corporate data to a central database, and analyzing the data to provide feedback to the laundry operation and/or the dispenser, particularly across an aggregation of multiple accounts within the same corporation.

SUMMARY OF THE INVENTION

A communications network coupling one or more chemical dispenser sites to a server computer and a database is useful to a corporation in managing its chemical product usage, as well as other costs. For example, a given hotel corporation operates multiple hotels throughout the nation. Each hotel, preferably corresponding to an account, includes one or more laundry operations (e.g., a dispenser site having a dispenser and one or more washing machines). The dispenser or detergent vendor operates a server computer and database to which dispenser data for one or more laundry operations within the corporation are stored. Exemplary dispenser data includes without limitation one or more of the following data types: dispensed detergent amounts; dispensing times, dates, and sequences; water temperature; water flow volumes; chemical product type; machine identifiers; washing machine signals; empty capsule indications; start/end of formula indications, formulas, and other information originating at the detector site, whether detected by a dispenser or by an associated device (such as a remote temperature probe). Corporate data relating to the laundry operation, such as account information, alignment information, utility costs, employee shift information, labor costs, and additional information relating to other aspects of the corporation or laundry operation, can be also be stored and analyzed alone or in combination with dispenser information.

By collecting and analyzing the dispenser and corporate data in the database, a dispenser vendor can analyze this data to generate performance information (such as product usage data) and provide feedback to the customer. For example, a calculation of the number of pounds of laundry washed per occupied room ("LbsOCR") can be made from a combination of dispenser data (e.g., the number of loads, which corresponds to the number of completed formulas) and corporate data (e.g., the number of occupied rooms). Furthermore, a target can be set (statically or dynamically) for the LbsOCR result, so that LbsOCR results that are above the target are flagged as "out-of-spec." "Out-of-spec" results, which may indicate inflated detergent, labor, and utility expenses, for example, can be fed back to the customer to allow the customer to improve its laundry procedures.

Furthermore, the analysis may be performed across multiple accounts, such as multiple accounts within a single corporation or organizational region, to compare, for example, one account in a corporation with others accounts with the same corporation. An alignment identifier is used to relationally group multiple accounts. In this manner, for example, the LbsOCR of one account in a corporation can be compared against the LbsOCR of other accounts in the corporation to determine its relative performance. The customer can then use this information to improve the laundry procedures at poorer performing accounts.

In accordance with the present invention, the above and other problems are solved by providing a monitor at a chemical product dispenser to automatically detect and communicate dispenser data. Real-time or historical dispenser data is communicated to be stored in a central database in combination with an account identifier, and corporate data (e.g., an alignment identifier) to facilitate analysis within and across accounts associated with a laundry operator. Furthermore, all data associated with a particular alignment identifier (e.g., a corporate identifier, a regional identifier, etc.) may be consolidated for analysis, providing, for example, a corporate customer with a broad view of problem trends and overall corporate performance of laundry operations in its multiple accounts. Furthermore, performance targets, including dynamic performance targets, may be employed to detect performance data that does not satisfy acceptable criteria.

A data processing system for managing use of chemical product in a chemical application system is provided. A chemical product dispenser distributes the chemical product to the chemical application system. A monitor module detects dispenser data based on distribution of the chemical product by the chemical product dispenser or some other detection mechanism associated with the dispenser or dispenser site. A database is coupled to the chemical product dispenser and stores the account identifier in association with the dispenser data of the chemical product dispenser. The database further stores corporate data in association with the dispenser data and the account identifier. An analysis application analyzes the dispenser data in relation with the corporate data to characterize use of the chemical product in the chemical application system.

A method and computer program product for managing use of chemical product in a chemical application system corresponding to a first customer account identified by an account identifier are provided. The chemical product is distributed to the chemical application system via a first chemical product dispenser. The first dispenser data is recorded based on distribution of the chemical product by the chemical product dispenser. The account identifier is recorded in association with the dispenser data of the first chemical product dispenser. Second dispenser data is monitored from a second chemical product dispenser corresponding to a second customer account. The first dispenser data of the first chemical product dispenser is analyzed relative to the second dispenser data of the second chemical product dispenser to characterize the use of the chemical product in the chemical application system.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

Figure 1:
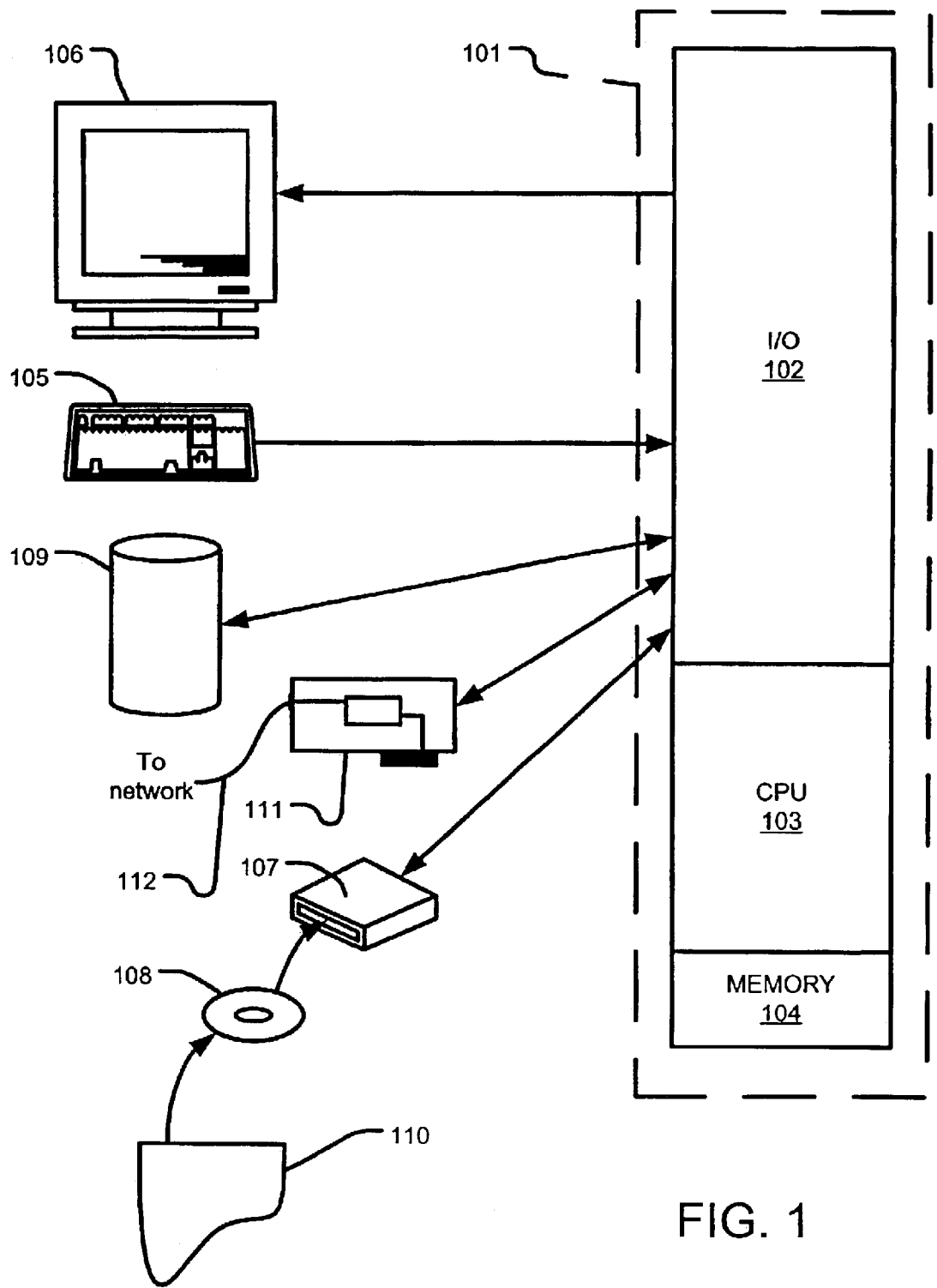
FIG. 1 depicts a general purpose computer that implements the logical operations of an embodiment of the present invention.

FIG. 1 depicts a general purpose computer capable of executing a program product embodiment of the present invention. One operating environment in which the present invention is potentially useful encompasses the general purpose computer. In such a system, data and program files may be input to the computer, which reads the files and executes the programs therein. Some of the elements of a general purpose computer are shown in FIG. 1 wherein a processor 101 is shown having an input/output (I/O) section 102, a Central Processing Unit (CPU) 103, and a memory section 104. The present invention is optionally implemented in software devices loaded in memory 104 and/or stored on a configured CD-ROM 108 or storage unit 109 thereby transforming the computer system in FIG. 1 to a special purpose machine for implementing the present invention.

The I/O section 102 is connected to keyboard 105, display unit 106, disk storage unit 109, and disk drive unit 107.

Generally, in contemporary systems, the disk drive unit 107 is a CD-ROM driver unit capable of reading the CD-ROM medium 108, which typically contains programs 110 and data. Computer program products containing mechanisms to effectuate the systems and methods in accordance with the present invention may reside in the memory section 104, on a disk storage unit 109, or on the CD-ROM medium 108 of such a system. Alternatively, disk drive unit 107 may be replaced or supplemented by a floppy drive unit, a tape drive unit, or other storage medium drive unit. The network-adapter 111 is capable of connecting the computer system to a network via the network link 112. Examples of such systems include SPARC systems offered by Sun Microsystems, Inc., personal computers offered by IBM Corporation and by other manufacturers of IBM-compatible personal computers, and other systems running a UNIX-based or other operating system. In accordance with the present invention, software instructions such as those directed toward communicating data between a client and a server; detecting product usage data, analyzing data, and generating reports may be executed by CPU 103, and data such products usage data, corporate data, and supplemental data generated from product usage data or input from other sources may be stored in memory section 104, or on disk storage unit 109, disk drive unit 107 or other storage medium units coupled to the system.

Figure 2A:
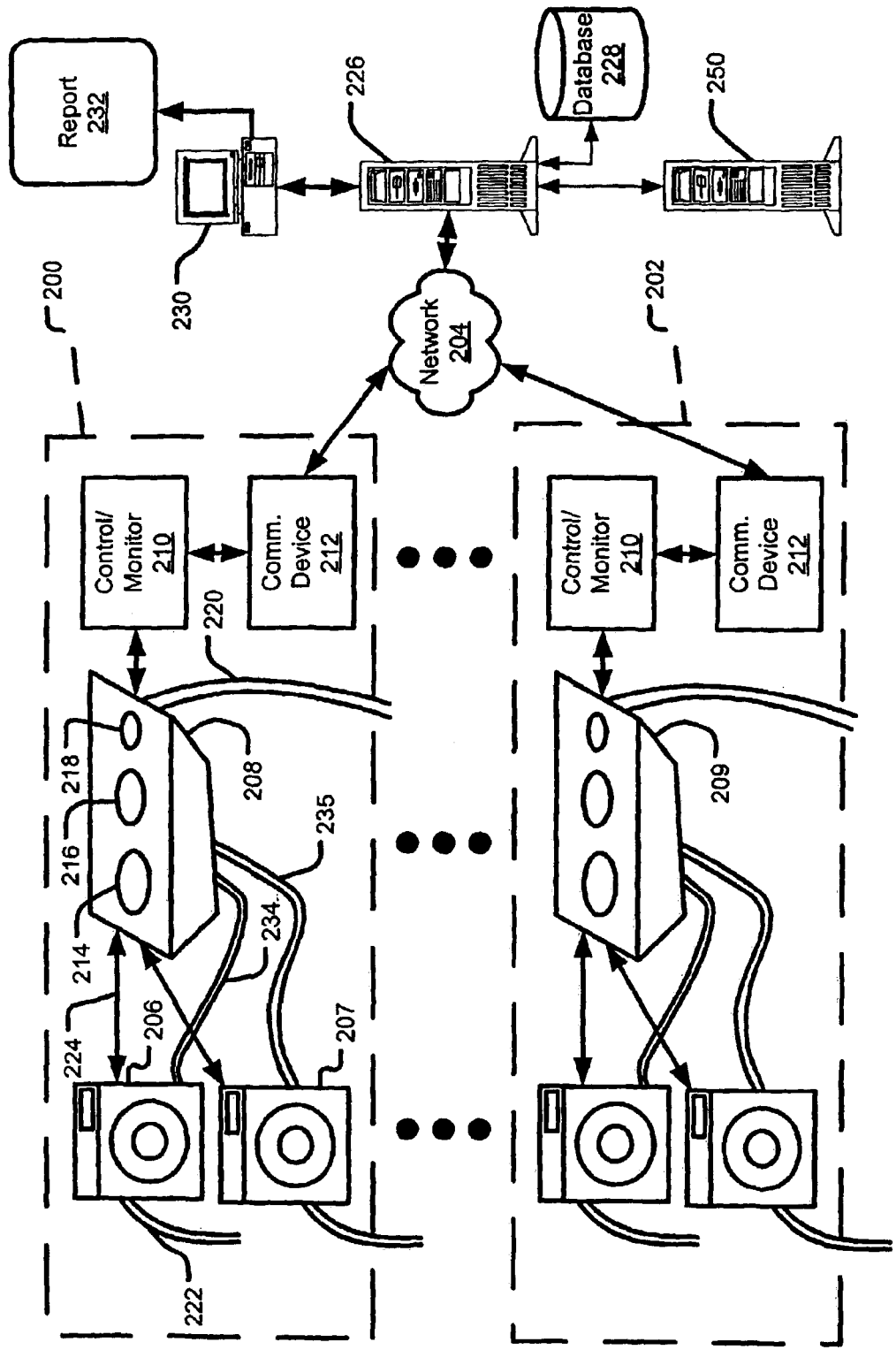
FIG. 2A illustrates an exemplary communications network including detergent dispensers coupled to a server computer in an embodiment of the present invention.

FIG. 2A illustrates an exemplary communications network including detergent dispensers 208 and 209 coupled to a server computer 226 in an embodiment of the present invention. An installation 200 includes washing machines 206 and 207, a detergent dispenser 208, a control/monitor module 210, and a communication device 212 located at a laundry operation associated with a customer account identifier. An installation 202 illustrates a second laundry operation in accordance with the present invention.

Generally, FIG. 2A is intended to represent one or more laundry operations coupled to the network 204. In an alternative embodiment, an installation may include multiple dispensers coupled to one or more washing machines each. Furthermore, although FIG. 2A shows individual control monitors in communication devices for each dispenser, in other embodiments, multiple dispensers may be coupled to a single control/monitor module, and a single communications device may be used to communicate data to and from multiple dispensers. It should also be understood that 1 or more dispensers may be associated with a single account, and one or more accounts may be associated with a single alignment ID (e.g., corporation).

The detergent dispenser 208 is coupled via hose 234 to the washing machine 206 and via hose 235 to washing machine 207. Washing machine 202, for example, is coupled to the dispenser 208 via a communications link 224. It should be understood that a dispenser can accommodate many different types of washing machines. Some installations, for example, include modern dispensers coupled to older washing machines via an analog interface.

Other detecting devices may be integrated with or used in association with the dispenser at the dispenser site within the scope of the present invention. For example, a flow meter for detecting water flow volume through input hose 234 may be used to generate detected dispenser data for storage in the database. Other examples may include a remote or integrated water temperature detector, a detector for determining the actual weight of laundry items in a wash basin, and other detection operations to provide detected dispenser data at the dispenser site.

In an embodiment of the present invention, the dispenser 208 supplies detergent and other cleaning products to the washing machine 206. Preferably, the detergent dispenser 208 receives containers of solid cleaning products into receptacles 214, 216 and 218. In an alternative embodiment of the present invention, four receptacles are provided by a dispenser. Accordingly, a dispenser having one or more receptacles for receiving liquid or solid chemical products is contemplated within the scope of the present invention.

An input hose 220 receives hot water from the facility's hot water system (not shown). Preferably, the water temperature is 120° F. or greater. The hot water mixes with the solid cleaning product mounted in the detergent dispenser 208 by flowing through the solid cleaning product until a required amount of the cleaning product is mixed with or dissolved into the hot water. The amount of cleaning product is measured directly using a technique detailed in U.S. patent application Ser. No. 4,845,965, entitled "METHOD AND APPARATUS FOR DISPENSING SOLUTIONS"; U.S. patent application Ser. No. 4,858,449, entitled "CHEMICAL SOLUTION DISPENSER APPARATUS AND METHOD OF USING"; and U.S. patent application Ser. No. 4,964,185, entitled "CHEMICAL SOLUTION DISPENSER APPARATUS AND METHOD OF USING", all assigned to the assignee of the present invention.

After a specified amount of cleaning product is supplied to the washing machine 206 (i.e., an example of a chemical application system), the dispenser 208 cuts off the cleaning product supply to the washing machine 206. The washing machine 206 receives the water and cleaning product mixture via hose 234, which continues its cycle with the supplied cleaning product in its basin. The dispenser is then flushed with fresh water from intake hose 220. The fresh water flows from the dispenser 208 through the hose 234 into the washing machine 206. The water and chemistry in the wash basin is applied to the laundry items during the washing machine cycle. After the cycle completes, the wastewater and chemistry are dumped from the basin into the facility's sewage line via hose 222.

Thereafter, the next washer cycle is signaled to the dispenser 208 from the washing machine 206 via link 224, which preferably consists of thirteen wires, although other communications links are contemplated within the scope of the present invention. In an embodiment of the present invention, the digital signal informs the dispenser 208 to transition to the next state in the cleaning product formula. In an embodiment having a washing machine providing analog cycle signals, the analog signals are preferably converted to digital signals before transmission to the dispenser.

Although a washing machine is an example of a chemical application system, other chemical application systems are contemplated within the scope of the present invention. Other examples include, without limitation, chemical dispensers used in dishwashers; chemical application systems for "clean in place" systems; water sanitizing systems such as, but not limited to, bath and spa systems; and herbicide dispensers in agricultural settings.

In an embodiment of the present invention shown in installation 200, the control/monitor module 210 is a processor driven control and monitoring circuit that preferably (1) controls the dispensing of cleaning product in accordance with selections made by a laundry operator, and/or (2) detects the amount and sequence of dispensed cleaning product, the signals received from the washing machine over communications link 224, the temperature of hot water flowing through the dispenser 208, and other parameters including time, date, and duration of each wash/dispense cycle. In an alternative embodiment of the present invention, the operation of the control/monitor module 210 may be limited to detecting data for communication to the database. Preferably, the control/monitor module 210 also includes a storage medium, such as a semiconductor memory device or a magnetic or optical storage device, for temporarily storing the dispenser data locally and for storing dispenser system data, such as formulas, dispenser numbers, account numbers, etc. However, the storage medium may be omitted in an alternative embodiment, particularly if generally continuous communication of dispenser data is made to a remote database or storage medium.

The communications device 212 is coupled to the control/monitor module 210 (1) to receive commands from the communications network 204 and (2) to access data detected and stored by the control/monitor module 210, including historical detected data and dispenser system data stored on the local storage medium. The communications device 212 may be programmed to access the communications network 204, preferably by a LAN (local area network), WAN (wide area network), a dial-up connection, or another well-known network connection.

In an embodiment of the present invention, the communications device 212 periodically accesses a server computer 226 to provide data for storage in the database 228. As such, the communications device 212 preferably accesses real-time data detected by the control/monitor module 210 and any historical data stored on a local storage medium for transfer to the database 228. In an alternative embodiment, the communications device 212 maintains communications with the server computer 226 over the communications network 204 continually; therefore, the local storage medium is unnecessary for storing detected data. Instead, the communications device 212 continually transmits real-time product usage data to the server computer 226. In this embodiment, a small cache device may nevertheless be employed to accommodate network congestion or other communication delays at the communications device 212.

The communications device 212 can also receive commands via the communications network 204 to provide a feedback loop to the laundry operation or the dispenser. These commands are transferred to the control/monitor module 210. Such commands may include formula updates, calibration commands, test commands, alarm commands, interactive communications between the laundry operator or service technician and the dispenser vendor or server computer facility, and other remote control commands. This capability facilitates the management of multiple, geographically dispersed laundry operations by allowing the operator, the service technician, or the dispenser vendor to distribute control commands from a central location via the communications network 204. An example of the use of the feedback loop involves updating a formula stored in the storage medium of a dispenser.

The client computer 230 represents a thick or thin client coupled to the server computer 226 via a communications link 234, such as a LAN. The client 230 initiates an analysis application resident on the client computer 230 or resident on the server computer 226 to generate reports, such as report 232 providing analysis of dispenser data and corporate data recorded in the database 228, and may also include other product usage data derived from a combination of the dispenser data and the corporate data. Broadly, "product usage data" refers to data relating to product usage or use of a chemical application system, which may include without limitation chemical application system usage information, labor usage information, utility usage information, procedural error information, and performance information.

Furthermore, in one embodiment of the present invention, the client computer 230 initiates commands through the communications network 204 to the communication devices of installation 200 and 202 for remotely managing the laundry operation (e.g., changing formulas).

A server computer 250 is optionally coupled to the server computer 226 to provide corporate data to the database 228. Corporate data may relate to one or more accounts in association with an alignment ID and may include without limitation labor, energy, water, detergent, and sewage costs, shift personnel identifiers, and the number of occupied rooms for given time periods. By communicating the corporate data automatically from the laundry operator's corporate or account business systems, manual entry of corporate data can be avoided. However, in an embodiment of the present invention, manual entry is contemplated, for example, using the client computer 230. Furthermore, the server computer 250 may be linked to other networks via a communications link 252.

Figure 2B:
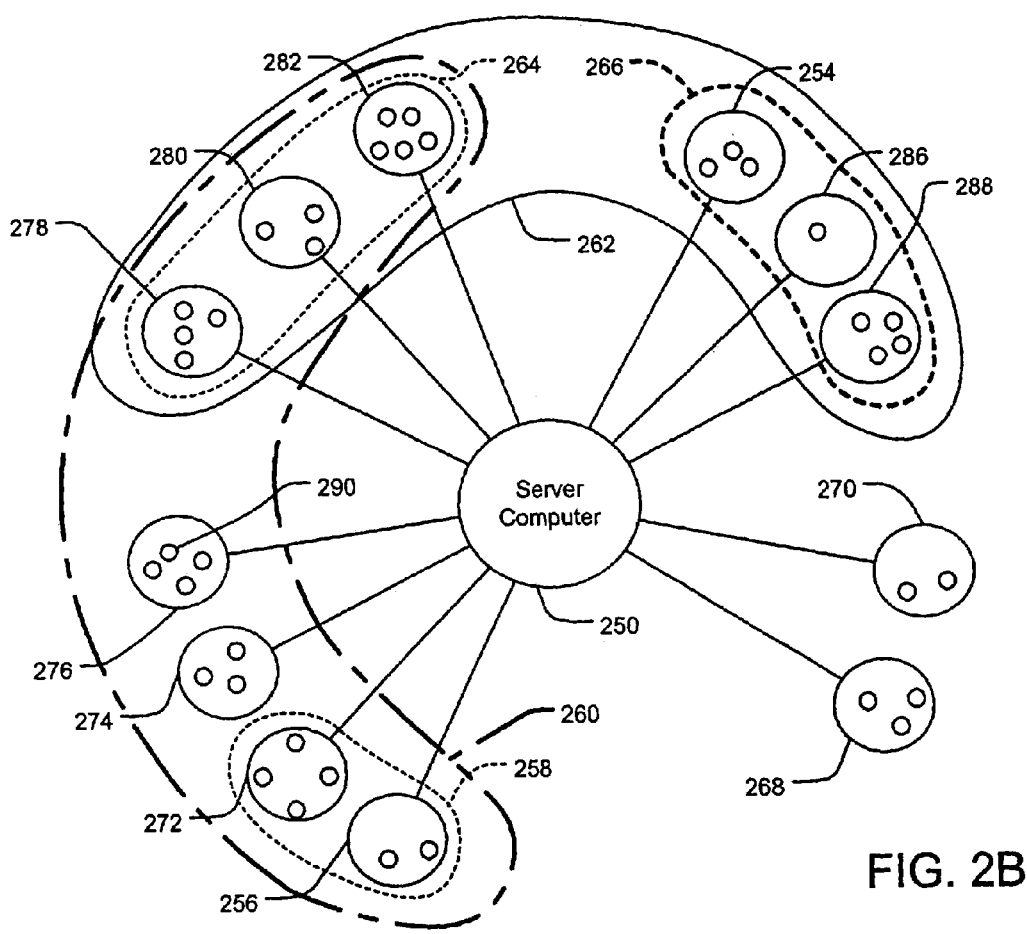
FIG. 2B illustrates an exemplary topology of dispensers, accounts, and alignments relative to a server-computer in an embodiment of the present invention.

FIG. 2B illustrates an exemplary hub and spoke topology of dispensers, accounts, and alignments relative to a server computer 250 in an embodiment of the present invention. Other topologies, such as a daisy chain topology or a ring topology, are also contemplated within the scope of the present invention. The server computer 250 is coupled to multiple accounts (such as a hotel account 276 or hospital account 254). Within each account are one or more dispensers (such as dispenser 290). Each account may include an alignment identifier to associate it with other accounts, as indicated by groupings (or "alignment groupings") 258, 260, 262, 264, and 266. The grouping relationships may be hierarchical (see groupings 258 and 260), or the grouping relationships may cut across hierarchical boundaries (see grouping 262). Note also that accounts 268 and 270 are not included in a grouping, preferably meaning that no alignment identifier is specified for these two accounts.

For example, grouping 260 indicates an alignment within a healthcare and lodging corporation. Accounts 256, 272, 274, 276, 278, 280 and 282 are accounts within the healthcare and lodging corporation. Furthermore, grouping 264 indicates a grouping of hospital accounts within the healthcare and lodging corporation, and a grouping 258 indicates an organizational alignment of hotels, such as a regional alignment (e.g., hotels in the Eastern United States), within the healthcare and lodging corporation. A grouping 266 indicates an alignment within a hospital corporation and includes accounts 254, 286, and 288. The grouping 262 is associated with hospital accounts in general and cuts across boundaries of the two corporate alignments. The grouping 262 is useful for analyzing product usage data across a given industry, for example.

Figure 3:
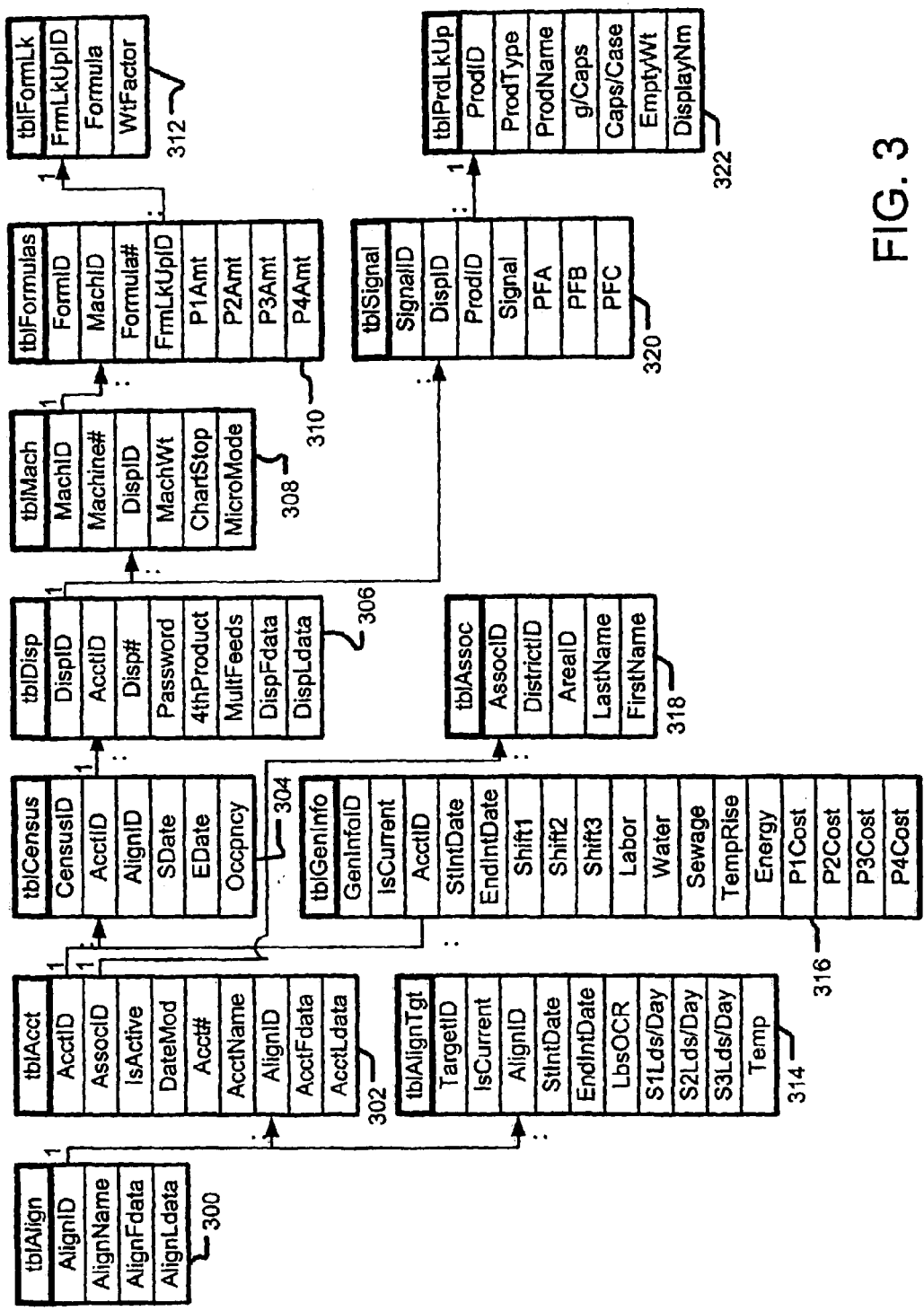
FIG. 3 illustrates an exemplary database schema in an embodiment of the present invention.

FIG. 3 illustrates a first portion of an exemplary database schema in an embodiment of the present invention. Each large box represents a data table used in the exemplary database 228 shown in FIG. 2A. The name of each data table is label at the top of each box (e.g., "tb1Acct"). "Table" generally refers to data arranged in rows and columns. In relational database management systems, information is primarily stored in the form of tables, with columns representing individual data fields in the table and rows representing individual entries in the table. In FIG. 3, the data fields (i.e., columns) of each table are listed below the label of the table.

A tb1Align table 300 contains information about a group of accounts. In a preferred embodiment, each row of the tb1Align table 300 corresponds to a given customer that manages one or more laundry accounts. The data field AlignID is a unique key for each row of the tbl Align table 300. The data field AlignID is an example of an alignment identifier useful for analysis of database information for a given corporation or other organizational category. It should be understood that, in an alternative embodiment, multiple levels of alignment ID may be used within the scope of the present invention. For example, a first alignment ID may correspond to a corporate customer level, and a second alignment ID level may correspond to regional divisions within the overall corporation. The data field AlignName contains a textual descriptor or label of the business entity corresponding to the tbl Align table entry.

The data field AlignFdata and AlignLdata, exemplary time period specifiers, indicate the first and last dates of a time period for which valid data exists in relation to a given AlignID. In this manner, the analysis application need not search all available data in the database to determine whether a requested time period contains valid data for a particular alignment ID. The label "1", positioned relative to the data field AlignID in the tbl Align table 300, and the infinity symbol (:), positioned relative to the data field AlignID in the tbl Acct table 302, indicate a one-to-many relationship between the tbl Align table 300 and the tbl Acct table 302.

A tbl Acct table 302 contains information about a given account (e.g., the laundry operations at a particular facility corresponding to a given AlignID). The data field AcctID is a unique key for a given account within the database. The data field AssocID includes a unique identifier representing a key to a tbl Assoc table 318. The tbl Acct table 302 also contains a data field IsActive, which specifies whether the associated account is currently under contract, currently operational, or some other active status. In a preferred embodiment of the present invention, the data field IsActive is a yes/no parameter, meaning that the row is the active row for a particular account, or it is not. The tbl Acct table 302 also contains a data field DateMod which includes the creation date for the tbl Acct table 302. A data field Acct# includes an account number assigned to the given account. Preferably, the account number is specified by the detergent vendor, dispenser vendor, or by some other source, so as to correspond to other corporate data. A data field AcctName is included in the tbl Acct table 302 and specifies a textual identifier for the account (e.g., an individual account of the fictional corporation "MegaHotel Corp."). The data field AlignID corresponds to an AlignID key from tbl Align table 300 to establish a relationship between the two tables.

The data fields AcctFdata and AcctLdata, exemplary time period specifiers, indicate the first and last dates of a time period for which valid row data exists in relation to a given AcctID. In this manner, the analysis application need not search all available data in the database to determine whether a requested time period contains valid data for a particular account ID.

A tbl AlignTgt table 314 specifies the performance targets of the laundry operation corresponding to an alignment ID stored in data field AlignID. The performance targets are used to determine when a particular operational result is "out-of-spec" (i.e., outside of desired target parameters). The data field TargetID represents the unique key for each row of the tbl AlignTgt table 314. The data field IsCurrent indicates whether the given row of the tbl AlignTgt table 314 is current for the value stored in the data field AlignID, relating back to the tbl Align table 300. Because the tbl AlignTgt table 314 relates to the tbl Align table 300 via a data field AlignID, the table-parameters stored in the tbl AlignTgt table 314 are assigned for a given alignment (e.g., corporation). Alternative target parameters can be configured for additional alignment levels or accounts by way of additional target tables. Furthermore, the target parameters may be changed over time using the data field IsCurrent and the data fields StIntDate and EndIntDate, which describe the first and last date of a time period during which the associated target parameters are valid.

The data field LbsOCR defines a target parameter for pounds (lbs.) per occupied room. The data fields S1Lds/Day, S2Lds/Day and S3Lds/Day define target parameters for the number of loads per day washed during three shifts. The data field Temp defines a target parameter for the hot water temperature supplied to a washer, preferably as detected by the dispenser.

In an embodiment of the present invention, the target parameters are specified with predetermined values that can be updated manually or automatically over time by adding new rows in the tbl AlignTgt table 314. In an alternative embodiment of the present invention, however, the target parameters may be a function of other data within the database. For example, by way of a database query, the average LbsOCR may be calculated and entered in the tbl AlignTgt table 314 for a particular time period and alignment ID. In an alternative embodiment, the target is dynamically set by taking the recent corporate average (i.e., the last 30 days of detected dispenser data and corporate data) and adjusting it by 20% to set a new target. For example, using a corporate average of 14.7 lbs. per occupied room over the past thirty days, a dynamic target of 17.64 lbs. per occupied room (14.7*1.2=17.64) is set. Therefore, all accounts have a lbs. per occupied room exceeding 17.64 are considered "out-of-spec".

A tbl Census table 304 describes occupancy data relating-to a particular account, as represented by data field AcctID and a particular alignment, as represented by data field AlignID. The tbl Census table contains a data field CensusID, which is a unique key for the table. The tbl Census table 304 also includes a data field SDate and EDate, which are exemplary time period specifiers defining the start and end date of a period for which the occupancy data in a given row is valid. In other words, if the laundry operator provides occupancy data, as supplied in data field Occpncy, on a weekly basis, then the start and end dates would define a week. Alternatively, for example, a daily occupancy result would have start and end dates that are equal or that would span a twenty-four hour period from one day to the next.

The tbl GenInfo table 316 contains information about costs, energy usage, and shift start times, although other general information parameters may be added within the scope of the present invention. A data field GenInfoID includes a unique key for each row of the tbl GenInfo table 316. The data fields StIntDate, EndIntDate and IsCurrent specify the time period for which a particular row of the tbl GenInfo table 316 is valid and whether it is the current entry in the tbl GenInfo table 316. The data fields StIntDate and EndIntDate are exemplary time period specifiers. The data field AcctID relates the row of the table tbl GenInfo table 316 to a particular account in the tbl Acct table 302. The date of the tbl GenInfo table 316 may be entered manually or it can be delivered automatically through a computer link to an appropriate source (e.g., a utility server, a hotel server, a corporate server, etc.).

The data fields Shift1, Shift2, and Shift3, indicate the start times of each work shift. In an alternative embodiment, start and end times of each work shift may be included in the tb1GenInfo table 316. The data field Labor indicates the cost per hour of the laundry operation labor force. In an alternative embodiment, labor can vary on a per shift basis or on an hourly basis (e.g., according to shift premiums) and may be specified with more detail in the tb1GenInfo table 316 in additional fields. Utility costs are represented by data fields Water, Sewage, and Energy. The cost of water is preferably represented on a per 1,000 gallon basis. The cost of sewage treatment is provided on a per 1,000 gallon basis. The cost of energy is indicated as the total energy used in therms by the laundry operation. A therm is a unit used to measure a quantity of heat and equals 100,000 British thermal units (BTUs). The data field TempRise indicates the number of degrees in Fahrenheit or Celsius that the water from the public utility must be heated in order to meet the target water temperature. The data fields P1Cost, P2Cost, P3Cost, and P4Cost indicate the cost of cleaning product on a per case basis. Alternative costing measures may be used, including cost of product on a per capsule basis or on a per measured amount basis.

The tb1Disp table 306 includes a unique key in data field DispID. The tb1Disp table 306 also includes the data field storing in an AcctID to relate the tb1Disp table 306 to an account. A data field Disp# stores a dispenser number assigned to the dispenser within an account. A password is stored in the data field Password, which regulates access to the program logic of the dispenser associated with each entry. For example, in order to change formulas at a given dispenser, a field service manager must enter the associated password into a keypad on the dispenser.

A data field 4thProduct is a yes/no field indicating whether the dispenser supports the dispensing of a fourth product. A data field MultFeeds is a yes/no parameter, indicating whether the dispenser supports multiple feeds of a given product per formula. That is, some dispensers support multiple cycles that request the same detergent to be dispensed within a particular formula. The data field MultFeeds stores the indicator of whether the dispenser supports such a capability. The data fields DispFdata and DispLdata, exemplary time period specifiers, define the first and last dates for which the data in a given row in the tb1Disp table 306 is valid.

A tb1Assoc table 318 includes a unique key in data field AssocID. An identifier of a particular sales district is contained in the data field DistrictID. A second level of hierarchy in the district is contained in the data field AreaID and the first and last name of the associate is stored in the data fields FirstName and LastName. Preferably an associate is a person responsible for managing an account, such as a field service technician or field service manager.

A tb1Mach table 308 contains a unique key in data field MachID. A data field Machine# contains a number identifying the machine (e.g., "1" or "2" in a dispenser that supports up to two machines) for each dispenser associated with the dispenser identifier in the data field DispID of the tb1Mach table 308. Alternative embodiments of the present invention may serve more than two machines. The data field MachWt indicates the capacity of the corresponding machine (e.g., thirty-five pounds or one hundred pounds). The data field ChartStop indicates whether the machine supports a command that puts the washing machine on hold, particularly during a bath cycle. A data field MicroMode indicates whether the dispenser is capable of taking signals in a specific format. Preferably, the specific format specifies both the product that the washing machine requests as well as the formula. In this fashion, the laundry operator can merely program the washing machine, for example, for "sheets", and the washing machine can communicate the corresponding formula identifier to the dispenser, rather than relying on manual settings on both the washing machine and the dispenser.

A tb1Formulas table 310 contains information about the formulas supported by a particular machine, which is specified by the identifier in the data field MachID. A unique key is stored in the data field FormID. A number associated with a particular formula is stored in the data field Formula#. In a preferred embodiment, the data field Formula# typically includes the numbers 1 through 10; however, the number of formulas need not be limited to ten formulas within the scope of the present invention. A data field FrmLkUpID stores a unique identifier used to look up a particular formula name and weight factor in the tb1FormLk table 312. The data fields P1Amt, P2Amt, P3Amt, and P4Amt store amounts of products to be dispensed during requested cycles of the washing process. P1, P2, P3, and P4 correspond to product numbers assigned to the various receptacles in the dispenser, such as detergents, bleaches, stain remover and rinse agents. Although only one amount is illustrated for each product in the tb1Formulas table 310 of FIG. 3, additional amount fields may be added for each product in support of the multiple feed capability identified in the tb1Disp table 306. In a preferred embodiment, three amounts are allowed for P1, three amounts are allowed for P2, one amount is allowed for P3, and three amounts are allowed for P4.

A tb1Signal table 320 contains information about signals received in a given dispenser. A unique key is stored in the data field SignalID. The dispenser ID associated with the dispenser receiving the signal is stored in the data field DispID. The unique key is stored in the data field ProdID and used to look up product information in the tb1PrdLkUp table 322. The data field Signal contains a number for the signal received from a given dispenser. In one embodiment of the present invention, the data fields PFA, PFB, and PFC contain product factor codes useful in determining the amount of cleaning product dispensed by a given dispenser. In an alternate embodiment, one or more product factor codes (e.g., PF1–PFn) may be used for each signal. Furthermore, one or more of the illustrated data fields may contain a null value (e.g., representing that the product factor is not used).

The tb1FormLk table 312 contains information relating to particular formulas supported by a dispenser. The data field FrmLkUpID is associated with a corresponding ID in the tb1Formulas table 310. The data field Formula contains a textual or numerical formula name or label for a given formula. The data field WtFactor contains an industry and vendor develop factor correlating the weight supported by a particular washer with a given laundry item. For example, the proper loading of a 100 lbs. washing machine basin with sheets is deemed by the industry or vendor to be 90 actual lbs. of dry linen, whereas the proper loading of a 100 lbs. basin with blankets is 70 lbs. Therefore the WtFactor for sheets is 0.9 and the WtFactor for blankets is 0.7.

A tb1PrdLkUp table 322 provides lookup data for given products. The data field ProdID contains a unique key for each product. The data field ProdType contains a product number or category relating to a product in a vendor's inventory. The data field ProdName contains a textual or numerical label identifying a given product. A data field g/Caps indicates the number of grams per capsule of product. The data field Caps/Case indicates the number of capsules in a case of the given product. A data field EmptyWt indicates the weight of an empty capsule. A data field DisplayNm indicates a name to be displayed on an LED (light emitting diode) display on a dispenser.

Figures 4A, 4B:
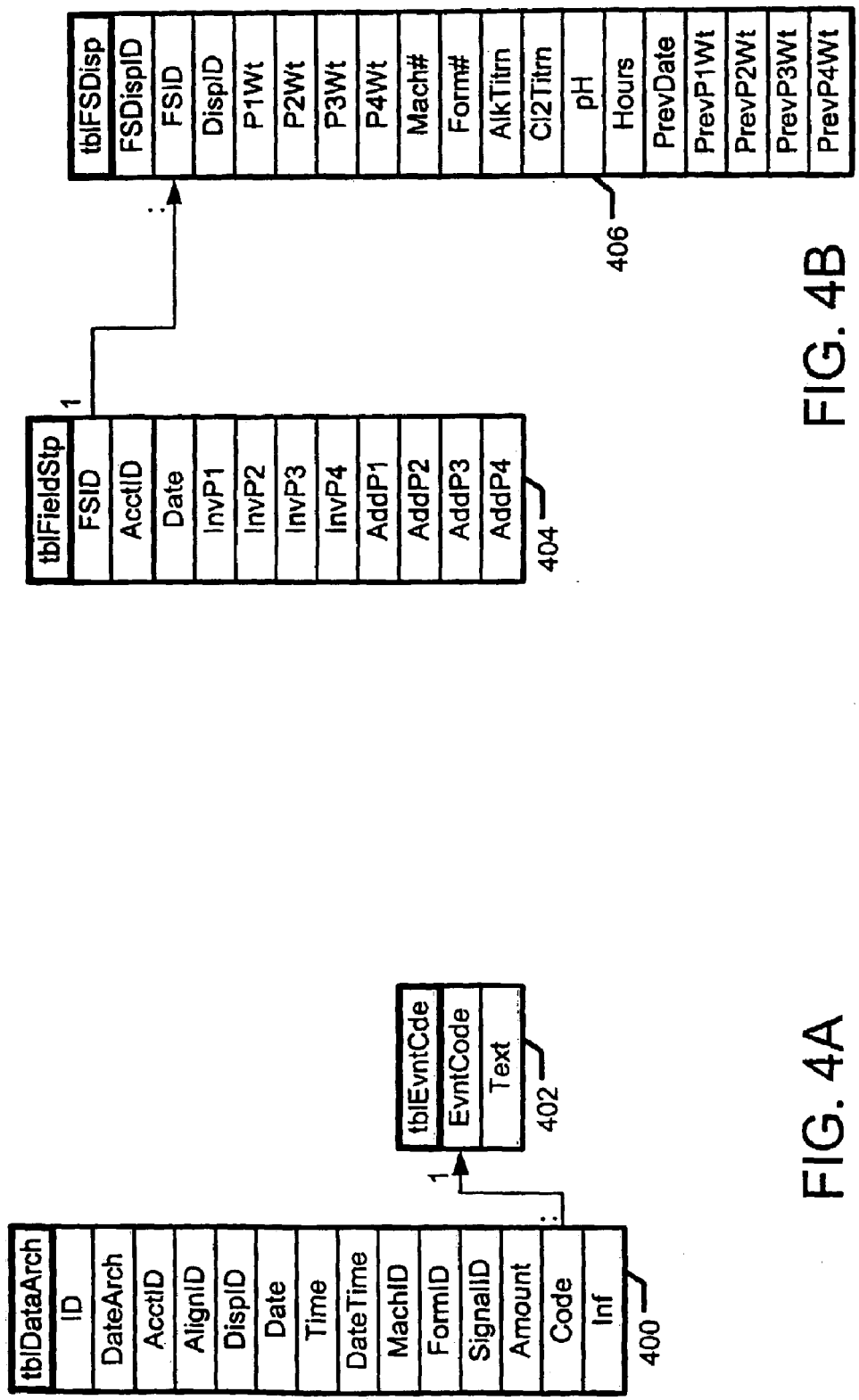
FIG. 4A illustrates a second portion of an exemplary database schema in an embodiment of the present invention.
FIG. 4B illustrates a third portion of an exemplary database schema in an embodiment of the present invention.

FIG. 4A illustrates a second portion of an exemplary database schema in an embodiment of the present invention. A tb1DataArch table 400 contains exemplary detected dispenser data communicated by a dispenser and communicated to the database. The data field ID is a unique key for each tb1DataArch table 400 entry. A data field DateArch contains the date of the recording of a given row of the tb1DataArch table 400. Date fields AcctID and AlignID correspond to unique keys of the tb1Acct table 302 and the tb1Align table of FIG. 3. The data fields Date and Time correspond to the date and time of a given event in the dispenser. The data field Date Time is preferably a concatenation or other combination of the date and time field entries. The data fields MachID, FormID, and SignalID correspond to the unique keys in the tb1Mach table 308, the tb1Formulas table 310, and the tb1Signal table 320 of FIG. 3. The data field Amount preferably contains a detected amount of product dispensed for a particular event or for a given event. A data field Code contains an event code to identify a particular event, as described in the tb1EvntCde table 402. A data field Inf contains informational data such as end of formula, start of formula, capsule empty signals, and other informational data detected by the dispenser.

A tb1EvntCde table 402 includes an EvntCode data field associated with the data field Code in tb1DataArch table 400. A data field Text includes text relating to the event code. The text may be displayed in a report to improve the readability of archived data.

Table 1 illustrates exemplary dispenser data communicated to a database of an embodiment of the present invention. Dispenser data can also include information based on detection of water temperature from a remote or integrated temperature probe, detection of the actual weight of laundry items in a wash basin, detection of water flow volume through a hose, and other detection operations at the dispenser site. In one embodiment of the present invention, code 68 indicates "start of formula", code 4 indicates a dispensing event, and code 36 indicates an "end of formula". Other codes are contemplated within the scope of the present invention, including a code indicating an empty product capsule. Furthermore, in an embodiment of the present invention, the "INFO" field indicates either water temperature (in association with codes 68 and 4) or complete formula time (in association with code 36).

TABLE 1

Exemplary Dispenser Data

| ACCNT# | DISP# | DATE | TIME | MACH# | FORM# | PROD# | AMOUNT | INFO | CODE |
|---|---|---|---|---|---|---|---|---|---|
| 98494825 | 1 | Apr. 1, 1998 | 2:44:00AM | 1 | 6 | 1 | 60 | 120 | 68 |
| 98494825 | 1 | Apr. 1, 1998 | 2:56:00AM | 1 | 6 | 4 | 4 | 122 | 4 |
| 98494825 | 1 | Apr. 1, 1998 | 2:57:00AM | 1 | 6 | 3 | 8 | 13 | 36 |
| 98494825 | 1 | Apr. 1, 1998 | 3:22:00AM | 1 | 1 | 1 | 120 | 116 | 68 |
| 98494825 | 1 | Apr. 1, 1998 | 3:31:00AM | 1 | 1 | 2 | 25 | 118 | 4 |
| 98494825 | 1 | Apr. 1, 1998 | 3:49:00AM | 1 | 1 | 4 | 4 | 120 | 4 |
| 98494825 | 1 | Apr. 1, 1998 | 3:49:00AM | 1 | 1 | 3 | 8 | 27 | 36 |
| 98494825 | 1 | Apr. 1, 1998 | 4:07:00AM | 1 | 1 | 1 | 120 | 122 | 68 |
| 98494825 | 1 | Apr. 1, 1998 | 4:16:00AM | 1 | 1 | 2 | 25 | 116 | 4 |
| 98494825 | 1 | Apr. 1, 1998 | 4:33:00AM | 1 | 1 | 4 | 4 | 118 | 4 |
| 98494825 | 1 | Apr. 1, 1998 | 4:34:00AM | 1 | 1 | 3 | 8 | 27 | 36 |
| 98494825 | 1 | Apr. 1, 1998 | 4:42:00AM | 1 | 1 | 1 | 120 | 120 | 68 |
| 98494825 | 1 | Apr. 1, 1998 | 4:52:00AM | 1 | 1 | 2 | 25 | 122 | 4 |
| 98494825 | 1 | Apr. 1, 1998 | 5:10:00AM | 1 | 1 | 4 | 4 | 116 | 4 |
| 98494825 | 1 | Apr. 1, 1998 | 5:10:00AM | 1 | 1 | 3 | 8 | 28 | 36 |
| 98494825 | 1 | Apr. 1, 1998 | 5:29:00AM | 1 | 4 | 1 | 125 | 118 | 68 |
| 98494825 | 1 | Apr. 1, 1998 | 5:40:00AM | 1 | 4 | 2 | 25 | 120 | 4 |
| 98494825 | 1 | Apr. 1, 1998 | 5:56:00AM | 1 | 4 | 3 | 0 | 27 | 36 |
| 98494825 | 1 | Apr. 1, 1998 | 6:16:00AM | 1 | 2 | 1 | 100 | 122 | 68 |
| 98494825 | 1 | Apr. 1, 1998 | 6:26:00AM | 1 | 2 | 2 | 18 | 116 | 4 |
| 98494825 | 1 | Apr. 1, 1998 | 6:44:00AM | 1 | 2 | 4 | 4 | 118 | 4 |
| 98494825 | 1 | Apr. 1, 1998 | 6:45:00AM | 1 | 2 | 3 | 8 | 29 | 36 |
| 98494825 | 1 | Apr. 1, 1998 | 7:41:00AM | 1 | 1 | 1 | 120 | 120 | 68 |
| 98494825 | 1 | Apr. 1, 1998 | 7:51:00AM | 1 | 1 | 2 | 25 | 122 | 4 |
| 98494825 | 1 | Apr. 1, 1998 | 8:08:00AM | 1 | 1 | 4 | 4 | 116 | 4 |
| 98494825 | 1 | Apr. 1, 1998 | 8:08:00AM | 1 | 1 | 3 | 8 | 27 | 36 |

FIG. 4B illustrates a third portion of an exemplary database schema in an embodiment of the present invention. A tb1FieldStp table 404 includes information captured by a field service technician at an account site. A data field FSID is a unique key in the tb1FieldStp table 404. A data field AcctID is a unique key from the tb1Acct table 302 of FIG. 3. A data field Date contains the date of a given field stop by a technician. Data fields InvP1, InvP2, InvP3, and InvP4 contain data entered into a dispenser or into a corporate database that can be communicated to the database of an embodiment of the present invention, representing the inventory of products P1, P2, P3 and P4 at a given account. Data field AddP1, AddP2, AddP3, and AddP4 represent the amount of given products shipped to an account, preferably received from a corporate database.

A tb1FSData table 406 contains data corresponding to each dispenser serviced during a field stop. FSDataID is a unique ID in the tb1IFSData table 406. The data field FSID corresponds to a unique key of the tb1FieldStp table 404. The data field DispID corresponds to a unique key of the tb1Disp table 306 of FIG. 3. Data fields P1Wt, P2Wt, P3Wt, and P4Wt contain information recorded by a technician as to the amount of product left in a capsule of a given product during the field stop.

A data field Mach# includes a machine number for the washing machine connected to a given dispenser. The machine number stored in data field Mach# corresponds to the machine from which tests are performed by the technician in the basin of the washing machine. Preferably, the technician extracts a sample of wash water from the basin of the machine to test the accuracy of the dispenser. A data field Form# indicates the current formula being dispensed by the dispenser to a given machine. A data field AlkTitrn indicates the results of a titration procedure measuring the alkalinity of the water in the basin of the machine under test in parts per million (PPM). A data field CL2Titrn indicates the results of a titration procedure measuring the chlorine in the water in the basin of the machine under test in PPM. A data field pH indicates the acidity of the water in the wash basin. A data field Hours indicates the number of hours for which the dispenser has run in a given account. A data field Notes contains any notes recorded by the technician during the field stop. A data field PrevDate indicates the last time a field stop was made at a given dispenser. Data fields PrevP1Wt, PrevP2Wt, PrevP3Wt, and PrevP4Wt indicate the amount of product left in a capsule for each product during the last field stop.

Figure 5:
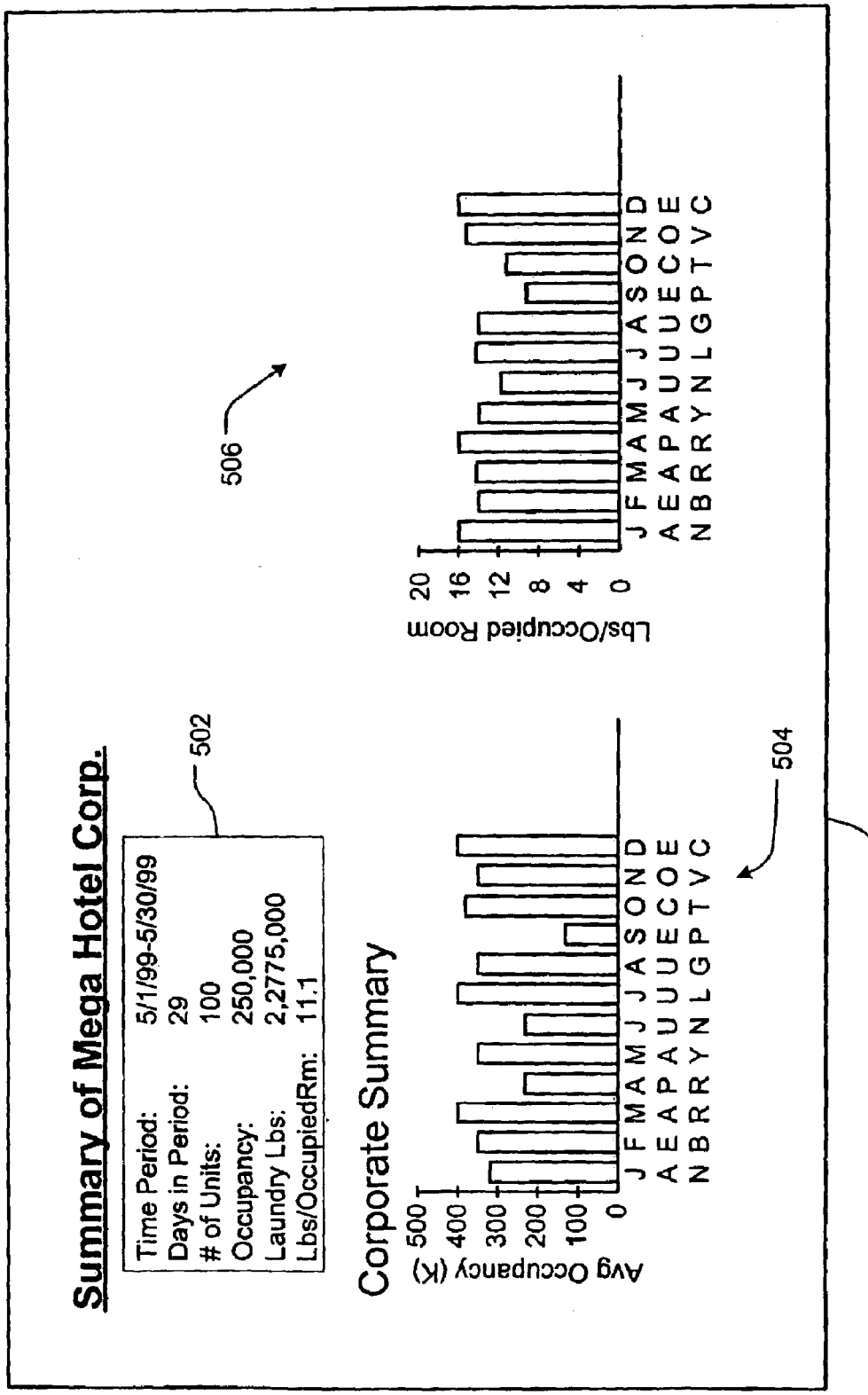
FIG. 5 illustrates an exemplary corporate summary report for a fictional laundry operator in an embodiment of the present invention.

FIG. 5 illustrates an exemplary corporate summary report 500 for a fictional laundry operator in an embodiment of the present invention. The report 500 is generated by an analysis application executing within the client/server architecture illustrated in FIG. 2A. Examples of analysis applications include small-scale and medium-scale database applications written in Microsoft Access running on a client computer but can also include large server-based database applications, pattern recognition applications, and neural net systems using minicomputers and mainframes. The dispenser data and/or corporate data used to generate the report is preferably retrieved from the database 228 of FIG. 2A, analyzed by the analysis application, and displayed to a user on the client computer 230. Alternatively, the report may be saved as a document file or printed out in hard copy.

Various elements of the report 500 correspond to data fields described by database schema of FIGS. 3 and 4 or are derived from data in such data fields. The report 500 relates to a summary of laundry operations (i.e., accounts) for a fictional hotel corporation. The hotel corporation in this example owns or manages multiple hotel facilities, each hotel facility having a corresponding account ID. Furthermore, each account reported in report 500 shares a common alignment ID to indicate, for example, that the individual accounts are managed by the same hotel corporation.

In an alternative report (not shown), summary and historical reports are available on an account-by-account basis, allowing the laundry operator a means of tracking and detecting wash errors and cost issues for an individual account. However, some laundry operation problems are not apparent on an account-by-account basis, and only reveal themselves when analyzed across multiple accounts. Therefore, a corporate summary, spanning multiple accounts corresponding to a single alignment ID, is useful in identifying trends and corporate-wide laundry operation problems. Accordingly, the hotel corporation can effectively manage its laundry operations on both an account-by-account basis and a corporate-wide basis to manage costs and improve efficiency. Such information, for example, may be useful in developing training programs for laundry employees, negotiating washer and dispenser maintenance agreements, negotiating chemical product supply agreements, and coordinating scheduled maintenance throughout a corporation's multiple laundry operations.

The exemplary report 500 shows summary data relating to a time period from May 1, 1999 to May 30, 1999, as shown in report section 502. The number of days in the time period is also shown. The number of units ("# of Units") field shows the number of accounts included in the summary report, as grouped according to their alignment ID. The "occupancy" label shows the number of occupied rooms within all of the corporation's accounts (e.g., individual hotel facilities) included in the summary. The "Laundry Lbs" label shows the number of pounds of laundry washed during the time period. The "Lbs/Occupied Rm" label shows a calculation based on the "Occupancy" and "Laundry Lbs" fields. The Lbs/Occupied Rm result is an example of product usage data derived from a combination of dispenser data and corporate data, demonstrating an advantage of an embodiment to the present invention. A dispenser is capable of detecting the number of washes performed during a particular time period by virtue of the number of times it provides cleaning product to a washing machine. This dispenser data can be communicated to the database via a communications device. In addition, the number of occupied rooms corresponding to a particular account is corporate data used to manage the business operations within a corporation. This corporate data may also be communicated to the database, for example, via a communications link from a business server computer.

Typically, the pounds of laundry washed is estimated based on the capacity of each washing machine unit in an account and the number of washes performed, which are examples of dispenser data. A method of estimating the pounds of laundry washed calculates the product of the washing machine size (e.g., 100 lbs.) times the WtFactor assigned to given type of laundry item. Over a period of time, the estimated pounds of laundry in each washed load are summed. In an alternative embodiment, a laundry operation having the capability of actually weighing the items in each load of laundry, perhaps by having a weighing mechanism within the washer itself, is also contemplated within the present invention.

The bar graph 504 shows the average occupancy (in units of 1,000 occupied rooms) on a monthly basis over a one year period. The bar graph 504 data is generated from real-time or historical occupancy data, which is an example of corporate data, received from the corporation and entered manually or automatically into the database. Bar graph 506 illustrates the pounds per occupied room on a monthly basis over a one year period. The data reflected in bar graph 506 is also derived from dispenser data and corporate data recorded in the database.

Figure 6:
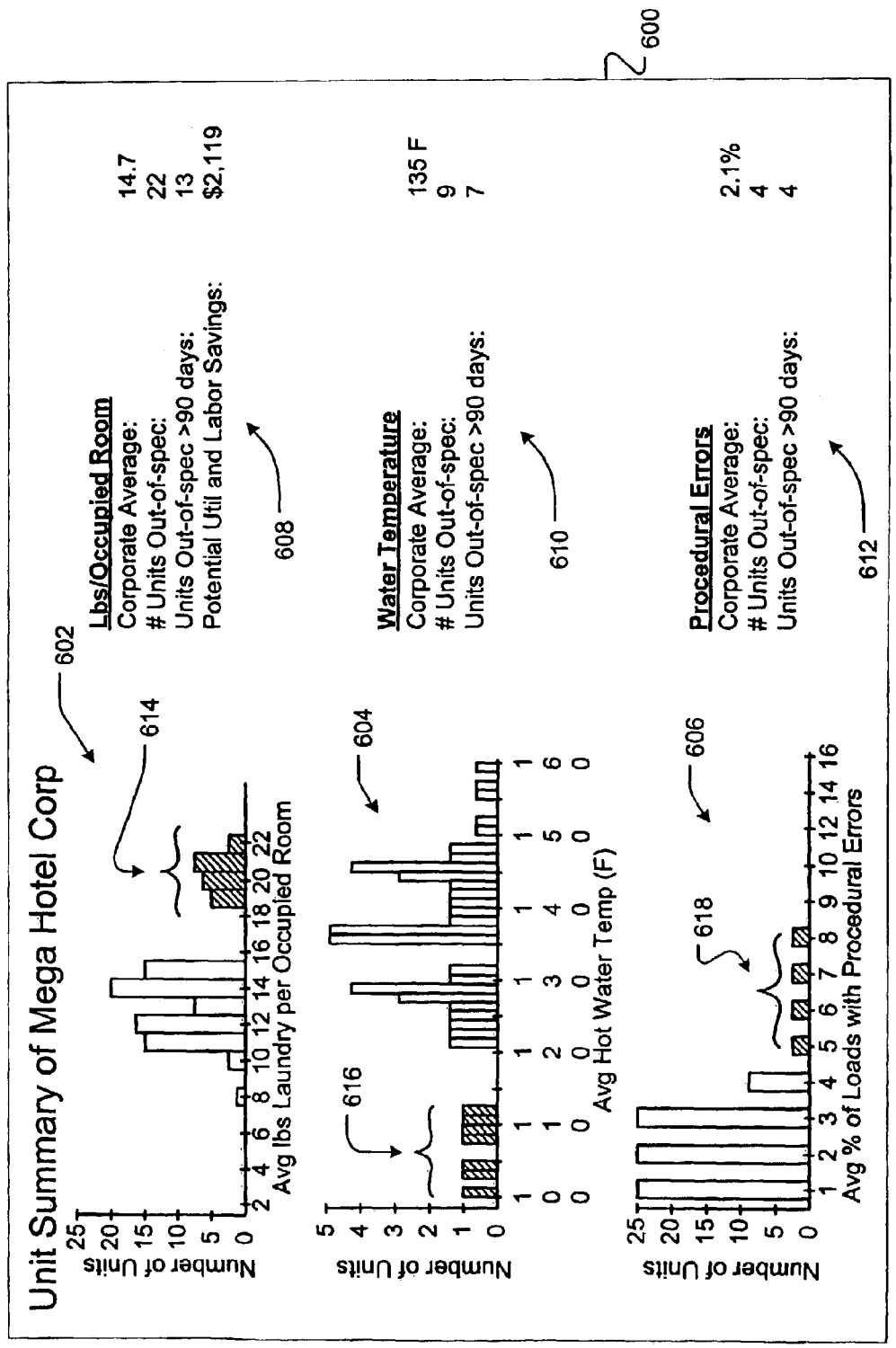
FIG. 6 illustrates an exemplary unit summary report for a fictional laundry operator in an embodiment of the present invention.

FIG. 6 illustrates an exemplary unit summary report for a fictional corporation in an embodiment of the present invention. The unit summary report 600 is generated by an analysis application running on the client computer or the server computer in an embodiment of the present invention. The bar chart 602 shows the number of units (i.e., accounts) having a calculated average pounds of laundry per occupied room. The bars indicated by region 614 indicate the number of units that are "out of spec" or outside of a desired threshold or target, as defined by target parameters from an alignment target table or account target table in database 228 of FIG. 2A. Such information is useful to control energy costs, for example. If a washing machine is not being run with full loads (as detectable in graphs 506 and 602 and report 608), energy needed to heat the water and run the washing machines is wasted on extra loads.

The report section shown at 608 profiles the pounds of laundry washed per occupied room, including the corporate average, the number of units out of spec, the number of units out of spec for more than ninety days, and the potential utility and labor savings available if the out-of-spec units were brought within target parameters. The "potential savings" result demonstrates a particularly useful advantage in combining dispenser data and corporate data into a central repository or database for analysis of remotely distributed laundry operations. Furthermore, if the out-of-spec units are distributed across multiple accounts, the magnitude of potential utility and labor savings would not have been as significant as they are when analyzed on a corporate-wide basis. The use of an alignment identifier allows analysis of selected aligned accounts across the entire corporation, an organizational component, or a geographical region, and amplifies management possibilities on a corporate-wide basis.

The bar chart 604 shows the number of units having a given average hot water temperature within a corporation. Hot water is a particularly crucial factor in the efficient performance of cleaning products and washing machines. In an embodiment of the present invention, a hot water temperature of 120° F. or greater is preferred for optimal cleaning performance, particularly for bleaching and oil removal. The bar chart 604 provides means for analyzing the hot water temperature on a corporate-wide basis. The results indicated by region 616 indicate the number of units that are out-of-spec relative to hot water temperature. In a preferred embodiment of the present invention, hot water temperature is measured by the dispenser as it flows through the dispenser and mixes with the solid cleaning products, although in an alternative embodiment, the hot water temperature may be measured separately by a remote sensor and provided to the database as corporate data.

Procedural error bar graph 606 and a report section 612 show the number of units having a given average of loads with procedural errors. A procedural error results when a dispenser setting and the washer setting are not set to correspond to the same wash item type. A procedural error is detected when the dispenser, being set to a given setting, expects washer signals in accordance with the selected formula. If the washer fails to provide the expected signals (e.g., if the dispenser is expecting a bleach signal from the washer, but never receives it), a procedural error will be flagged and communicated to the database. The analysis application sums the number of units having an average given number of errors during a specified time period and generates the bar graph 606 to illustrate the results. The results indicated by region 618 indicate the number of units that are out-of-spec relative to the average percentage of loads with procedural errors. The report 612 illustrates the corporate average across all or a predetermined set of accounts. The report 612 also indicates the number of units that are out-of-spec and the number of units that are out-of-spec for greater than ninety days.

An alternative method of detecting procedural errors uses timing discrepancies between an actual formula time and an expected formula time. For example, when the washer program is correct a formula may require 25 minutes to complete from signal 1 to signal 3. If a wrong formula is used on the washer (relative to the setting on the dispenser), the washer program may only require 20 minutes (e.g., without a bleach cycle). This discrepancy is flagged as a procedural error.

Figure 7:
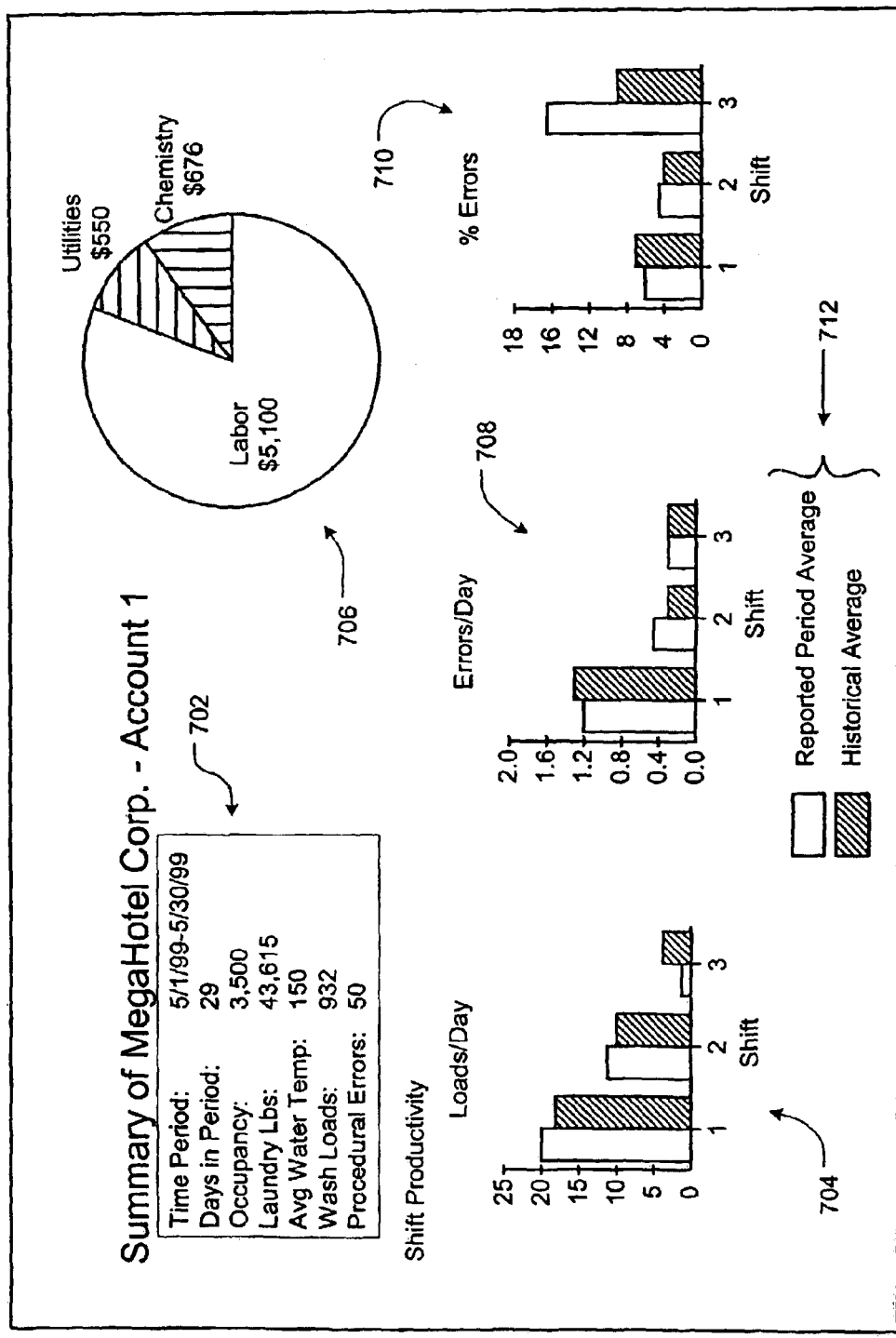
FIG. 7 illustrates exemplary shift productivity and cost reports for a fictional laundry operator in an embodiment of the present invention.

FIG. 7 illustrates exemplary shift productivity and cost reports for a fictional laundry account in an embodiment of the present invention. A corresponding report may be generated for an entire corporation or other organization subdivision, in accordance with the alignment ID. The report 700 includes individual reports, such as summary report section 702, a pie chart 706, and shift productivity bar graphs 704, 708 and 710. A legend 712 is also illustrated in report 700. The report section 702 includes a time period, the number of days included in the time period, the total occupancy during the time period, the pounds of laundry washed during the time period, the average water temperature during the time period, the number of wash loads during the time period, and the number of procedural errors detected during the time period. Using corporate data available from the database, in combination with industry accepted formulas or other actual corporate data, a pie chart 706 illustrates the allocation of expenses relating to the time period shown in report section 702.

The bar graph 704 illustrates the number of loads per day washed during the time period and divided by shifts. As shown by the legend 712, the bar graph 704 shows both the average loads washed per day during the time period, and a historical average calculated over the life of the account. The bar graph 708 illustrates the number of procedural errors detected per day on a per shift basis. As shown by the legend 712, the bar graph 708 shows both the average errors occurring during the time period, and a historical average calculated over the life of the account. In bar graph 710, the percentage of procedural errors is shown on a per shift basis. As shown by the legend 712, the bar graph 710 shows both the average percentage of errors occurring during the time period, and a historical average calculated over the life of the account.

Figure 8:
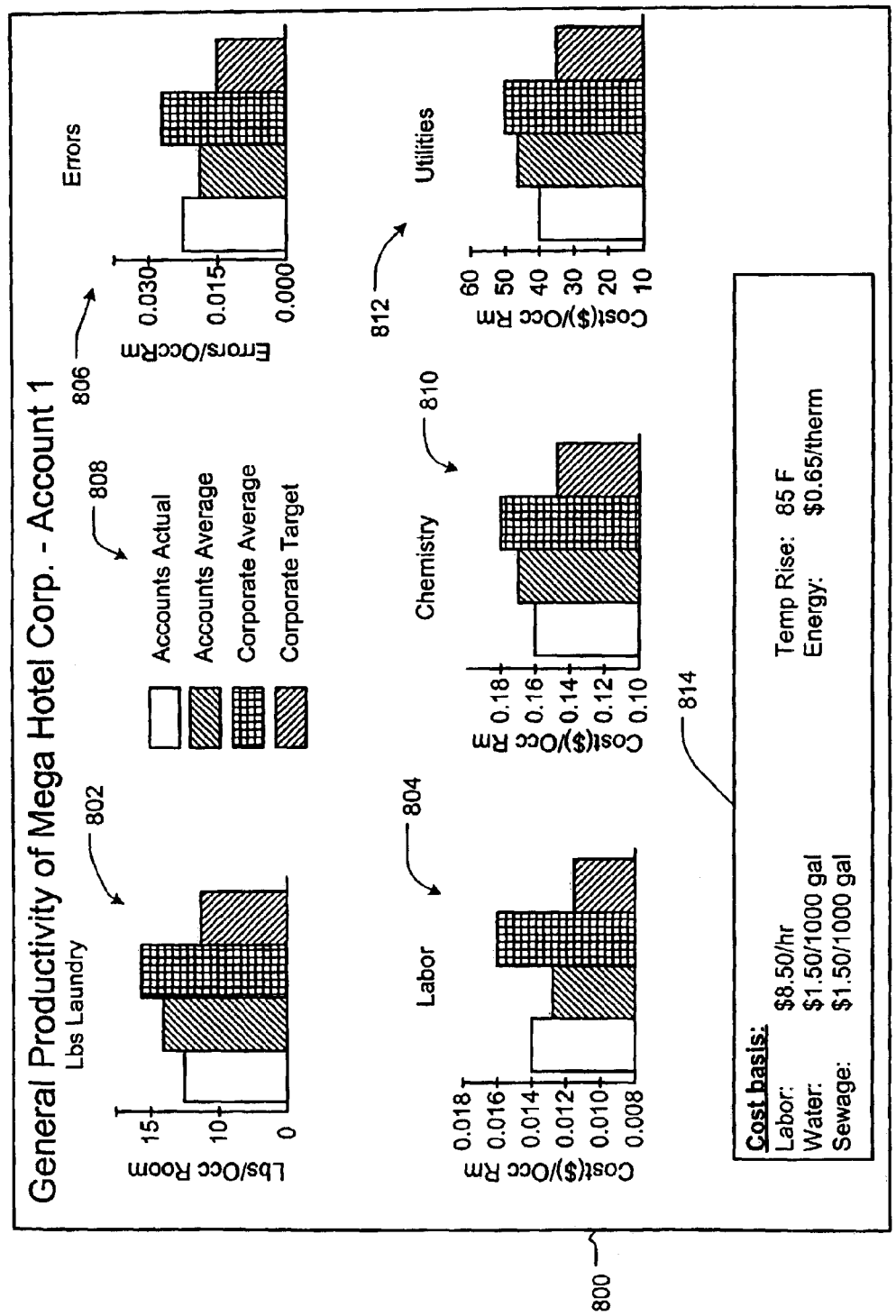
FIG. 8 illustrates exemplary general productivity and cost basis reports for a fictional laundry operator in an embodiment of the present invention.

FIG. 8 illustrates exemplary general productivity and cost basis reports for a fictional laundry account in an embodiment of the present invention. The report 800 includes bar graphs 802, 804, 806, 810 and 812. The bar graph 802 illustrates the pounds of laundry washed per occupied room. The bar graph 804 shows the cost of labor per occupied room associated with the laundry operation. The bar graph 806 illustrates the number of procedural errors per occupied room. The bar graph 810 illustrates the cost of chemistry per occupied room. The bar graph 812 illustrates the cost of utilities per occupied room. As indicated by legend 808, the bar graphs 802, 804, 806, 810 and 812 include actual results (i.e., detected over the time period shown in report section 702 of FIG. 7), an average of a particular account, the overall corporate average, and the corporate target.

The report section 814 summarizes the cost basis used in the report 800. The components of the report section 814 illustrate exemplary corporate data elements recorded in the database. The labor cost basis, for example, may be an average labor cost, or may be further broken out into specific labor costs for the laundry operators or for individual shifts. Likewise, the water, sewage and energy costs may be averages or estimates, or they may be updated on a real time basis. The temperature rise data element indicates the differential between the water temperature received from a public utility and the hot water temperature detected in a dispenser.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the manufacture and use of the composition of the invention. Embodiments of the present invention; however, may be applied in areas other than laundry operations. For example, in an agriculture applications, a herbicide dispenser may be supply herbicide to a chemical application system, such as an irrigation system or a herbicide sprayer on a crop duster or tractor. The herbicide dispenser data (e.g., timing, amount, and identity of herbicide being dispensed) may be combined with corporate data (e.g., chemical costs, labor costs, field production results, weather conditions, soil conditions, and type of plants) to manage chemical usage. Furthermore, sanitation systems in the food and beverage industries and water treatment industries are also contemplated within the scope of the present invention. As many embodiments of the invention can be made without departing from the spirit and scope of the invention, the invention resides in the claims hereinafter appended.

What is claimed is:

1. A system for monitoring a plurality of cleaning installations operated by at least one business entity, wherein each cleaning installation comprises a chemical product dispenser for dispensing one or more chemical products, a monitor module and one or more sensors for detecting operating parameter data associated with operation of the cleaning installation, the sensors providing operating parameter data signals to the monitor module, and wherein the monitor module is operable to store and transmit the received operating parameter data, the system comprising:

a central server computer in operable communication with the monitor modules to obtain the operating parameter data from the monitor modules, wherein the operating parameter data comprises dispenser data relating to distribution of the one or more chemical products in relation to operation of the cleaning installations, the central server computer further operable to analyze the operating parameter data and generate therefrom a management report comprising information relating to usage associated with one or more of the cleaning installations.

2. The system of claim 1 wherein monitor modules are located at different locations and operated by a corporation, and wherein the central server computer is operable to generate a report of operating parameter data corresponding to the monitor modules at the different locations for the corporation.

3. The system of claim 1, wherein the management report comprises operating parameter data relative to target operating data.

4. The system of claim 1 wherein the management reports is used to optimize cleaning installation operation.

5. The system of claim 1 wherein the central server computer provides the management reports to an operator of the one or more cleaning installations.

6. The system of claim 1 wherein the central server computer transmits one or more commands to the monitor module, the commands causing the monitor module to affect an operating setting of a cleaning machine at the cleaning installation.

7. The system of claim 1 wherein the management report further comprises operational data for use in facilitating analysis of cleaning installation performance.

8. The system of claim 1 wherein the management report further comprises data related to maintenance of a cleaning machine at the cleaning installation.

9. The system of claim 3 wherein the central server computer is operable to determine the target operating data based on received operating parameter data.

10. The system of claim 1 wherein the management reports is provided to the at least one business entity electronically via a network.

11. The system of claim 3 wherein the target operating data is based on business entity averages.

12. The system of claim 1, wherein the management report comprises information relating to utility usage by the cleaning installation.

13. The system of claim 1, wherein the management report comprises information relating to chemical product usage by the cleaning installation.

14. The system of claim 1, wherein the cleaning installation comprises a warewash machine.

15. The system of claim 1, wherein the cleaning installation comprises a laundry machine.

16. The system of claim 1, wherein the one or more chemical products are dispensed to a compartment internal to a cleaning machine at the cleaning installation.

17. The system of claim 1, wherein the one or more chemical products are dispensed to a location external to a cleaning machine at the cleaning installation.

* * * * *